United States Patent [19]

Gudorf

[11] 4,222,058

[45] Sep. 9, 1980

[54] CHARGE PLATE WITH CONDUCTIVE PADS AND METHOD OF MANUFACTURE

[75] Inventor: James L. Gudorf, Dayton, Ohio

[73] Assignee: The Mead Corporation, Dayton, Ohio

[21] Appl. No.: 950,623

[22] Filed: Oct. 12, 1978

Related U.S. Application Data

[63] Continuation-in-part of Ser. No. 912,495, Jun. 5, 1978.

[51] Int. Cl.[2] .......... G01D 15/18
[52] U.S. Cl. .......... 346/75
[58] Field of Search .......... 346/75; 29/628

[56] References Cited

U.S. PATENT DOCUMENTS

| | | | |
|---|---|---|---|
| 3,586,907 | 6/1971 | Beam et al. | 346/75 |
| 4,124,926 | 11/1978 | Kupsky et al. | 29/628 |

*Primary Examiner*—George H. Miller, Jr.
*Attorney, Agent, or Firm*—Biebel, French & Nauman

[57] ABSTRACT

Connection of electrical leads to individual charge electrodes in a charge plate structure is facilitated by the formation of conductive pads extending from each charge electrode to the corresponding electrical lead. The conductive pads are formed by applying a mask, containing open areas corresponding to areas between individual charge electrodes and electrical leads, to the charge plate structure and spraying a conductive epoxy resin onto the mask. Electrical connections between the leads and charge electrodes are rapidly and reliably made in this manner.

3 Claims, 5 Drawing Figures

CHARGE PLATE WITH CONDUCTIVE PADS AND METHOD OF MANUFACTURE

CROSS REFERENCE TO RELATED APPLICATION

This application is a continuation in part of application Ser. No. 912,495, filed June 5, 1978, entitled Charge Plate and Method of Manufacture.

BACKGROUND OF THE INVENTION

This invention relates to charge plates for use in a laminated coating head of the general type described in Beam et al. U.S. Pat. No. 3,586,907, and more particularly to an improved method of connecting electrical leads to charge electrodes in such charge plates.

As explained in copending application Ser. No. 912,495, coating heads of the type described by Beam et al. are used in ink jet printing systems, which create printed matter by selective charging, deflecting, and catching of drops produced by one or more rows of continuously flowing ink jets. The jets themselves are produced by forcing ink under pressure through a series of orifices in an orifice plate, which is one component of the laminated head.

A stimulation arrangement stimulates the jets to break the ink up into uniformly sized and regularly spaced drops, with drop formation occurring in all jets at more or less fixed positions, all located approximately the same distance from the orifice plate. The charge plate is positioned within the coating head so that electrical charging of selected ones of the drops being generated is achieved.

A charge plate of the type used by the Beam et al. patent utilizes a plate of dielectric material provided with a series of charging tunnels located equidistantly along a straight line. Each charging tunnel is coated with an electrically conductive material which defines a cylindrical charging electrode. Electrical leads must be connected to each such charge electrode, and the electrical leads in turn are selectively activated by an appropriate data processing system.

Typical prior art charge plates including such electrodes are disclosed in Solyst, U.S. Pat. No. 3,975,741, in Kuhn, U.S. Pat. No. 3,984,843, and in Bassous et al., U.S. Pat. No. 4,047,184. The prior art also includes charge plates having charging electrodes formed in notches along the edges of the plate, as disclosed in the above mentioned Solyst patent, and also in Robertson, U.S. Pat. No. 3,604,980, Culp, U.S. Pat. No. 3,618,858, and in Van Breemen et al., U.S. Pat. No. 4,035,812.

In addition to the difficulties arising in the fabrication of charge plates, described in detail in copending application Ser. No. 912,495, difficulties have also arisen in reliably and rapidly connecting electrical leads to each individual charge electrode on the charge plate. Previous methods for connecting the electrical leads to each charge electrode used laborious and slow hand painting, with conductive paint, of a connecting line between each lead and charge electrode. The difficulty of such an operation will be appreciated when it is remembered that the center-to-center spacing of each charge electrode is only about 0.423 mm and each charge electrode has an internal diameter of only about 0.355 mm, leaving a spacing between charge electrodes of only about 0.068 mm. Depending upon the size of the charge plate and the area to be printed, anywhere from several hundred to over one thousand connections per charge plate must be made. The previous methods suffered not only from the length of time required to complete the operation, but also from globbing of the conductive paint over into charge electrode tunnels and partially blocking them and irregularities in the conductive connecting lines being painted. This resulted in either a poor or no connection on the one hand to two or more connections flowing into one another on the other.

Accordingly, the need exists in the art for a rapid and reliable method for connecting electrical leads to charge electrodes on a charge plate.

SUMMARY OF THE INVENTION

Electrically conductive pads are formed on a charge plate extending from each individual charge electrode to the corresponding electrical lead of a multiple lead cable by applying an electrically conductive coating of material through open areas in a mask. The electrically conductive coating can be an epoxy resin containing silver particles which will permanently adhere to the charge plate structure and can be sprayed onto the charge plate.

The mask through which the conductive coating is applied can be made by either of two alternative methods. The first method is to form the mask from a thin plate of copper or copper alloy. Such a thin plate can be etched, using photofabrication and etching techniques well-known in the art, to provide slots which correspond to the intended size and relative placement of the electrically conductive pads on the charge plate structure. One side of the mask is lightly sprayed with an adhesive, and that side of the mask is then laid down onto the charge plate and aligned. With proper alignment, each slot in the mask will extend from a charge tunnel to an electrical lead from a cable which has been attached to the charge plate structure.

The second method of making the mask is to form it from photoresist material. Photoresist is applied to the charge plate and is then exposed, using well-known photofabrication techniques, through a positive working master which contains openings corresponding to the areas where the conductive pads are to be placed. After exposure, the photoresist material is developed and removed from the areas corresponding to where the conductive pads are to be placed. The photoresist mask is now ready to be sprayed with the conductive resin.

Conductive epoxy resin is oversprayed onto the mask (either of copper or photoresist material) to completely cover the individual areas between the electrical leads and charge electrodes. To insure a good electrical connection, the conductive resin is sprayed into the charge electrode tunnels to overlap with the conductive material in such tunnels. After spraying, the mask is removed and the charge plate is ready for use. In the case where a photoresist mask has been used, it must be stripped away using known photoresist removal methods. Any extraneous conductive resin will be removed upon removal of the mask. In the case where electrical leads are to be attached to both sides of the charge plate structure, the masking and spraying procedure is repeated for the opposite side of the charge plate.

Accordingly, it is a primary object of this invention to produce a more rapid and reliable method of attaching electrical leads to charge electrodes in a charge plate structure. This and other objects and advantages of the invention will be apparent from the following description, accompanying drawings, and the appended claims.

DESCRIPTION OF THE PREFERRED EMBODIMENTS

Figure 1:
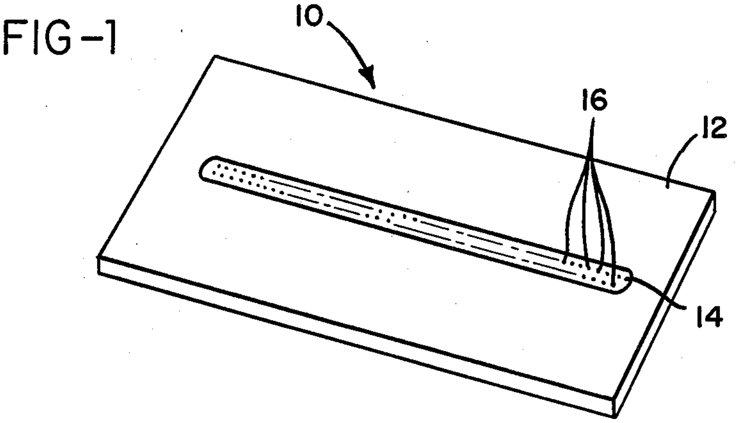
FIG. 1 is a perspective view of a charge plate with support structure and charge electrodes.
Figure 2:
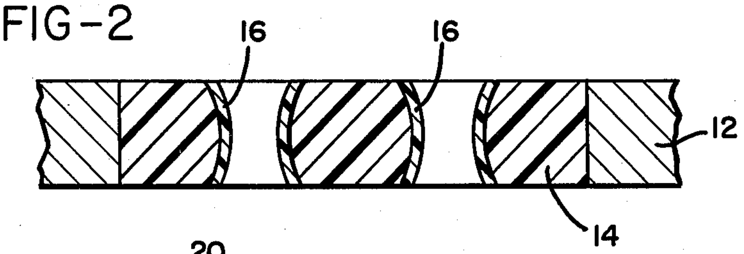
FIG. 2 is an enlarged cross-sectional view of a charge plate structure with charge tunnels.
Figure 3:
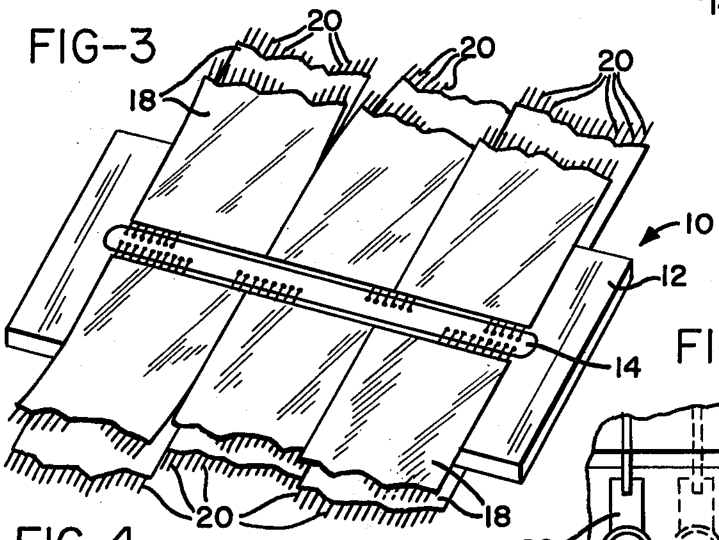
FIG. 3 is a pictorial drawing of a fully assembled charge plate.

As shown in FIGS. 1, 2, and 3 and as described more fully in copending application Ser. No. 912,495, herein incorporated by reference, charge plate 10 is formed by casting a nonconductive electrode support structure 14 containing charge electrodes 16 within support plate 12. Charge electrodes 16 are formed during the casting operation and when finished are on the order of at least about 1.0 mm thick and have an hour glass configuration best shown in FIG. 2. At the time of casting, electrodes 16 are formed when a conductive epoxy coating, such as epoxy resin containing silver particles available under the name ECR 4100 from Formulated Resins, Inc., Greenville, R.I., transfers from the casting mold to the sides of electrode support structure 14. After completion of the fabrication of the charge plate, it is ready for attachment of flexible printed circuit leads. As illustrated in FIG. 3, cables 18 containing a multiplicity of leads 20 are attached to charge plate 10. Preferably, the cables are attached to both sides of the charge plate.

Figure 4:
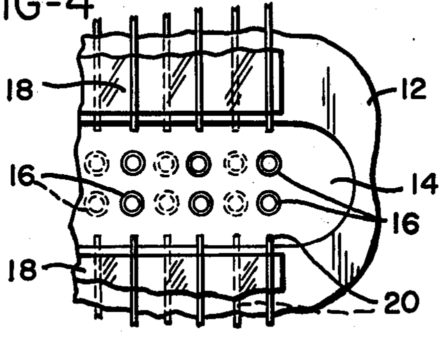
FIG. 4 is a top view of a section of a charge plate with cables attached.
Figure 5:
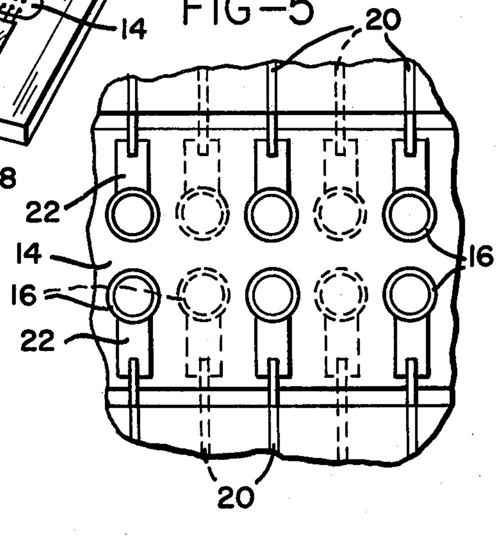
FIG. 5 is a top view of a section of a charge plate after conductive pads have been laid down.

As illustrated in FIG. 4, cables 18 are attached on either side of charge plate 10 with leads 20 aligned with individual charge electrodes 16. Leads 20 are now ready to be electrically connected to individual charge electrodes 16. A mask is prepared, and a conductive epoxy resin is sprayed onto the mask to form conductive pads 22 illustrated in FIG. 5. This conductive epoxy resin is preferably the same resin containing silver particles which has been used previously to form the charge electrodes. The resin may be thinned for easier spraying by mixing it with a small amount of toluol. It is important that the spray overlaps the conductive coating on the charge electrodes to assure a good electrical connection. After removal of the mask with accompanying removal of excess resin, the conductive pads which now connect leads 20 with charge electrodes 16 are allowed to cure for several hours to assure their adherence to the electrode support structure. The masking and spraying procedure is then repeated for the leads on the opposite side of the charge plate. Although the rows of charge electrodes have been illustrated as having the individual electrodes aligned directly opposite each other, it is to be understood that in practice the rows of electrodes may be offset from each other by various degrees depending upon the intended alignment of the charge plate in the ink jet printer. If the rows of electrodes are offset from each other, corresponding changes in the masks utilized in forming the conductive pads would have to be made.

To form the mask, two different methods have been found to produce satisfactory results. The first method makes use of a mask formed from a thin copper plate. Preferably, the mask is formed from an alloy of beryllium and copper and has a thickness of about 0.006 inches. Using a negative master of the areas which correspond to where the conductive pads are to be laid down, the copper alloy mask is etched to provide slots for those areas. Just prior to masking, one side of the mask is lightly sprayed with an adhesive and placed, adhesive side down, onto the charge plate. The adhesive helps to prevent movement of the mask after proper alignment. Once the mask has been properly aligned, conductive epoxy resin is sprayed onto it and into the charge tunnels. Upon removal of the mask, sharply defined conductive pads connecting the electrical leads to the charge electrodes have been formed.

The second masking method involves use of photoresist material. Photoresist material is applied to the surface of the charge plate covering the areas where the conductive pads are to be formed. The photoresist material is then exposed through a positive working master which has open areas corresponding to those areas on the charge plate onto which the conductive pads will be formed. After exposure, the photoresist material is developed and removed from areas which were exposed. Conductive epoxy resin is then sprayed onto the charge plate and into the individual charge electrodes. The photoresist material is then stripped away taking any excess resin along with it and leaving behind well defined conductive pads connecting the electrical leads to the charge electrodes.

It will be appreciated that once a master copper mask or positive working master for the photoresist method has been fabricated, the hundreds of individual connections to be made on a charge plate can be rapidly and reliably made. Such masks can be used repeatedly with great time savings as compared to the prior art hand painting methods.

While the apparatus and methods herein described constitute preferred embodiments of the invention, it is to be understood that the invention is not limited to these precise methods or apparatus, and that changes may be made in either without departing from the scope of the invention.

What is claimed is:

1. In a charge plate for an ink jet printer including a rigid support plate having a medially extending elongated slot, a nonconductive plastic electrode support structure provided with a series of molded charge tunnels having a thickness on the order of at least about 1 mm. and cast in place adheringly against the walls of said slot, charge electrodes coated upon the walls of said tunnels, and electrical lead means attached to said electrodes alternately on opposite sides of said electrode support structure, the improvement comprising:

electrically conductive pads adhered to said electrode support structure extending from each of said charge electrodes to each corresponding electrical lead means, electrically connecting each of said charge electrodes to each corresponding electrical lead means.

2. The charge plate of claim 1 wherein said electrically conductive pads are formed from a conductive epoxy resin.

3. The charge plate of claim 2 wherein the conductive epoxy resin contains silver.

* * * * *